(12) United States Patent
Holmberg et al.

(10) Patent No.: US 11,793,191 B2
(45) Date of Patent: Oct. 24, 2023

(54) GAME CALL APPARATUS FOR ATTRACTING ANIMALS TO AN AREA

(71) Applicant: Rogue LLC, Menard, TX (US)

(72) Inventors: Steven C. Holmberg, Kennedy, NY (US); Gary Roberson, Menard, TX (US); Randal P. Stuart, Jamestown, NY (US); Stephen W. Cass, Frewsburg, NY (US)

(73) Assignee: Rogue LLC, Menard, TX (US)

( * ) Notice: Subject to any disclaimer, the term of this patent is extended or adjusted under 35 U.S.C. 154(b) by 0 days.

(21) Appl. No.: 17/751,551

(22) Filed: May 23, 2022

(65) Prior Publication Data
US 2022/0279774 A1 Sep. 8, 2022

Related U.S. Application Data

(63) Continuation of application No. 16/223,333, filed on Dec. 18, 2018, now Pat. No. 11,337,417.

(51) Int. Cl.
*A01M 31/00* (2006.01)
*H04R 3/04* (2006.01)
*H04R 17/00* (2006.01)

(52) U.S. Cl.
CPC ............ *A01M 31/004* (2013.01); *H04R 3/04* (2013.01); *H04R 17/00* (2013.01); *H04R 2420/09* (2013.01)

(58) Field of Classification Search
CPC ....... A01M 31/00; A01M 31/004; H04R 3/04; H04R 3/12; H04R 17/00; H04R 2420/09
USPC .............. 446/397, 404; 119/719; 700/94; 704/200; 367/139
See application file for complete search history.

(56) References Cited

U.S. PATENT DOCUMENTS

| 4,105,992 A | * | 8/1978 | Luciano ................ A01M 29/18 43/124 |
| 5,085,610 A | * | 2/1992 | Engel ..................... A63H 19/10 446/175 |
| 5,145,447 A | * | 9/1992 | Goldfarb .................. A63F 9/24 446/143 |

(Continued)

*Primary Examiner* — Joseph B Baldori

(57) ABSTRACT

An apparatus for attracting an animal to an area includes a housing, recordable memory media contained within the housing for storing a pre-recorded ultrasonic sound and a prerecorded audible sound. An audible sound emitter contained within the housing is also provided for emitting the prerecorded audible sound. Further, an ultrasonic sound emitter contained within the housing for emitting the prerecorded ultrasonic sound and second pre-recorded sounds that simulate first and second distinct sounds each made by a species of animal in the environment. A user interface, such as a hand held unit, is also provided to play back the audible and ultrasonic sounds simultaneously to produce a blended sound for attracting an animal. The apparatus may further include a first amplifier for amplifying the audible sound and a second amplifier for amplifying the ultrasonic sound. A low pass filter for filtering the audible sounds and a high pass filter for filtering the ultrasonic sounds from a mono file may also be included. The ultrasonic sound simulates ultrasonic vocal sounds of animals and the audible pre-recorded sound simulates audible vocal sounds of animals.

20 Claims, 12 Drawing Sheets

(56) References Cited

U.S. PATENT DOCUMENTS

| | | | | |
|---|---|---|---|---|
| 5,642,092 A * | 6/1997 | Dunne | ............... | G08B 7/066 |
| | | | | 340/331 |
| 5,864,626 A * | 1/1999 | Braun | ............... | G09F 25/00 |
| | | | | 381/2 |
| 6,289,626 B1 * | 9/2001 | Williams | ............... | A01M 31/06 |
| | | | | 43/2 |
| 6,414,906 B1 * | 7/2002 | Gaspari | ............... | A01M 31/004 |
| | | | | 446/397 |
| 6,757,574 B2 * | 6/2004 | Gardner | ............... | A01M 31/004 |
| | | | | 381/124 |
| 7,133,528 B2 * | 11/2006 | Stilwell | ............... | A01M 31/004 |
| | | | | 381/124 |
| 7,243,060 B2 * | 7/2007 | Atlas | ............... | G10L 21/028 |
| | | | | 704/200 |
| 8,164,462 B1 * | 4/2012 | Bose | ............... | A01M 29/18 |
| | | | | 89/37.01 |
| 10,058,089 B1 * | 8/2018 | Stephens | ............... | G10K 9/122 |
| 2003/0058740 A1 * | 3/2003 | Jincks | ............... | A01M 31/002 |
| | | | | 367/139 |
| 2008/0159079 A1 * | 7/2008 | Dir | ............... | A01M 31/002 |
| | | | | 119/719 |
| 2014/0241128 A1 * | 8/2014 | Donoho | ............... | A01M 29/16 |
| | | | | 367/139 |
| 2015/0073795 A1 * | 3/2015 | Tan | ............... | G10L 17/02 |
| | | | | 704/243 |
| 2016/0014511 A1 * | 1/2016 | Sheen | ............... | H04R 5/04 |
| | | | | 381/98 |
| 2019/0261621 A1 * | 8/2019 | Smith | ............... | A01M 31/004 |
| 2020/0137493 A1 * | 4/2020 | Mandell | ............... | H04R 3/04 |

* cited by examiner

GAME CALL APPARATUS FOR ATTRACTING ANIMALS TO AN AREA

FIELD OF INVENTION

The embodiments of the present invention generally relate to an electronic animal call apparatus used to attract a target animal. The apparatus emits sounds with frequencies in the audible range, as well as sounds with frequencies in the ultrasonic range.

BRIEF SUMMARY

An apparatus for attracting an animal to an area includes a housing which contains within the housing recordable memory media for storing prerecorded animal sound data files and various control data, user preferences and playlists of user programmable sequences of animal sounds. The animal sound files may contain audible sound data or ultrasonic sound data or a combination of both. A speaker, or other audible sound emitter, is also provided for emitting audible range sounds. Further, an ultrasonic sound emitter contained within the housing is provided for emitting ultrasonic range sounds. A user interface, such as a hand-held remote control, is provided such that the user can select specific sounds and activate the sound reproduction function to play back both the audible and ultrasonic sounds simultaneously to produce a blended sound for attracting the target animal. The apparatus may further include first an amplifier circuit for amplifying the audible sounds through the speaker, and a second amplifier circuit for amplifying the ultrasonic sounds through the ultrasonic sound emitter. Further, first a filter circuit may be provided prior to the audible amplifying circuit for improved audible quality, and a second filter circuit may be provided prior to the ultrasonic amplifying circuit for improved sound quality. The audible and ultrasonic sound data may contain pre-recorded or simulated sounds of several types including vocalized sounds originated by the target species or prey of the target species, sounds created by physical action of the target species or prey of the target species, such a rubbing of antlers against a tree, rodent claws running across leaves or ice, or environmental sounds, such as the sound of leaves rustling or water in a stream. In particular, the sound data may include sounds of distressed, lost, feeding, and/or mating animals.

An apparatus for attracting an animal to an area or animal call apparatus includes a housing, recordable memory media contained within the housing for storing a pre-recorded ultrasonic sound and a prerecorded audible sound. An audible speaker contained within the housing is also provided for emitting the prerecorded audible sound. Further, an ultrasonic sound emitter contained within the housing for emitting the prerecorded ultrasonic sound and second prerecorded sounds that simulate first and second distinct sounds each made by a species of animal in the environment. A user interface, such as a hand-held unit, is also provided to play back the audible and ultrasonic sounds simultaneously to produce a blended sound for attracting an animal. The apparatus may further include a first amplifier for amplifying the audible sound and a second amplifier for amplifying the ultrasonic sound. A low pass filter for filtering the audible sounds and a high pass filter for filtering the ultrasonic sounds from a mono file may also be included. The ultrasonic sound simulates ultrasonic vocal sounds of animals and the audible pre-recorded sound simulates audible vocal sounds of animals.

In one embodiment, the apparatus may contain rechargeable batteries or primary non-rechargeable batteries such as alkaline cells or both for providing power to the apparatus. In the case of both type batteries are installed, the user can select which battery type to provide power, and upon depletion, the other battery type is then available for a backup power source. Battery status monitor may also be included as a unique flashing pattern on an LED display located on the apparatus housing and in some embodiments, status is transmitted by the microcontroller via a wireless communication link to a remote user interface.

A method of generating an animal sound to attract a game animal to an area is also provided. The method includes (A) providing an animal sound to produce a single channel sound file; (B) converting the single channel sound file to an analog audio signal using a digital to analog converter; and (C) simultaneously emitting the audible sounds from an audible sound emitter and the ultrasonic sounds from an ultrasonic sound emitter to produce a blended animal sound. The method may include a step of filtering the analog audio signal with a high pass filter and a low pass filter to separate the audible and ultrasonic sounds, wherein only audible sounds are received from the low pass filter and emitted by the speaker and the ultrasonic sounds are received from the high pass filter and emitted by the ultrasonic sound emitter.

In another embodiment, both audible and ultrasonic sounds are emitted from both the speaker and ultrasonic sound emitter, which act to filter the sounds. The animal sound may be provided by recording an animal sound with a microphone capable of recording ultrasonic audio or may be provided from separate pre-recorded audible and ultrasonic sound files that are combined to produce the single channel sound file. Generally, the ultrasonic sound emitter transmits sounds at 20,000 hertz frequency and above and the audible speaker transmits sounds at 20,000 hertz, frequency and below. The specific ranges of the emitted sounds from the ultrasonic sound emitter and audible speaker may be adjustable. In one embodiment, the ultrasonic sounds are emitted at a frequency of between 40,000 and 30,000 Hertz and the audible sounds are emitted a frequency of 15,000 Hertz or less. In addition, in some embodiments, the single channel sound file may be a .WAV file and a microprocessor is configured to read playback specific information for determining how to play back the sounds.

DETAILED DESCRIPTION

Figure 1:
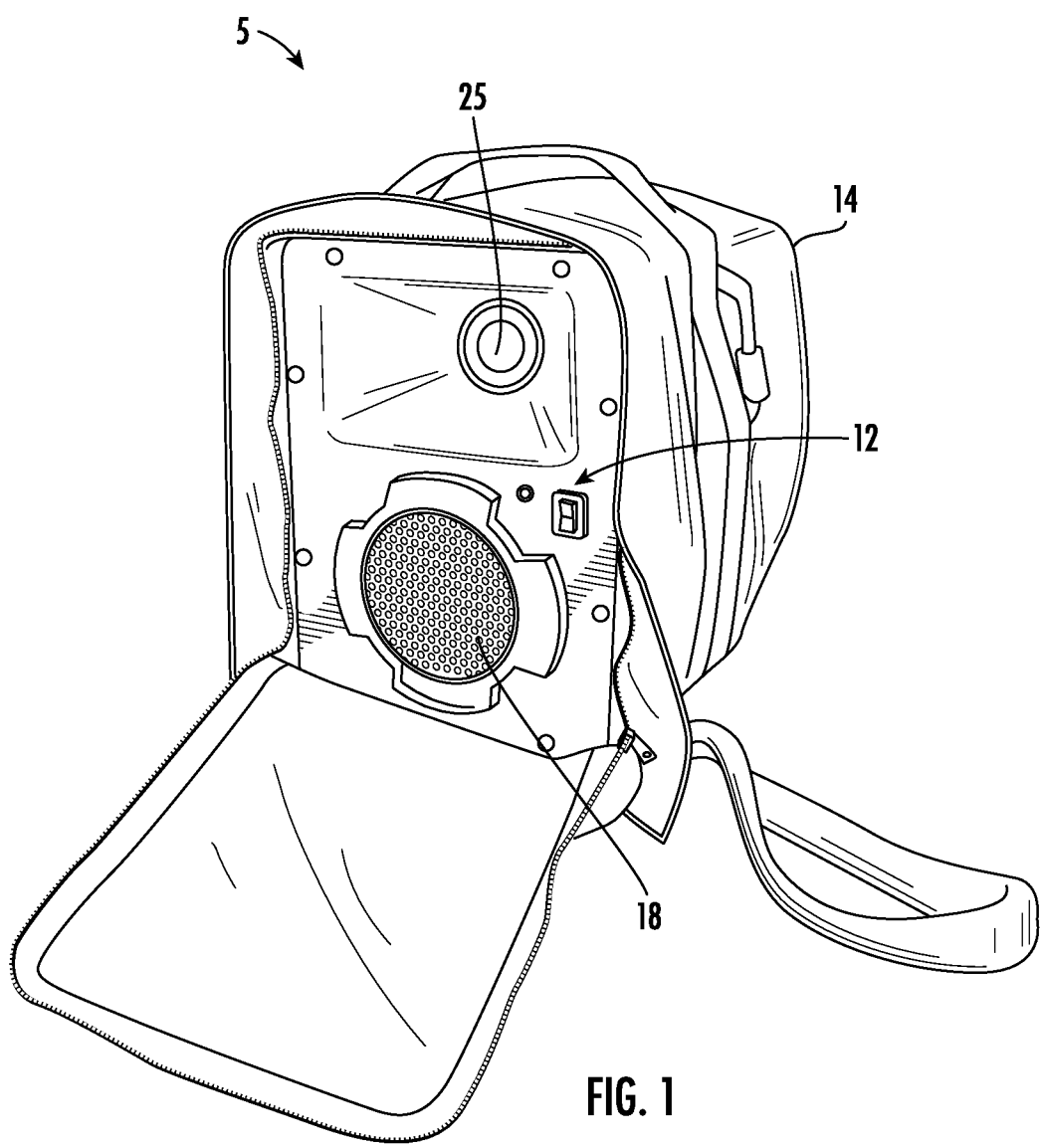
FIG. 1 shows an animal call apparatus enclosed within a housing and tote.

In general, an animal call apparatus functions to gain the attention of an intended target animal from a distance, attract the target animal near to a user's area, draw the target animal into an open area within range of the hunter, as well as to entice the target to focus on the decoy rather than the hunter, thereby decreasing typical defensive behavior such as bolting or otherwise leaving the area where a hunter is located. These functions are best accomplished by closely reproducing the sounds of an animal that will attract a target animal such as sounds of its prey, other animals of the same species, or the like.

Almost all desired target animals have hearing capabilities above humans. For example, wild felines, canines, and cervidae (deer, elk) have high frequency hearing capability of 30,000 Hertz and above. These animals can sense ultrasonic sounds, which aids in detecting the presence of rodents and birds in order to hunt same for food. In contrast, though humans are reported to hear up to about 20,000 hertz but with reduced sensitivity above 8000 hertz and a dramatic drop in sensitivity in sound above 15,000 hertz. Hearing range in humans varies from person to person and decreases with age and exposure to loud sounds.

There are three basic sources of ultrasonic animal sounds: (1) though animals typically lack vocal chords, they are capable of generating ultrasonic sounds by pushing air through their windpipe, thus creating a whistle or flute effect; (2) rodents generate ultrasonic sounds in order to communicate with each other, mating, feeding, lost or particularly when hurt or under distress; (3) though birds cannot hear the high frequencies themselves, birds nonetheless have ultrasound components in their tweets and chirps, particularly when in distress. The sounds of distress can be enticing to a predator as it sees distressed prey as an easy catch. In addition, the clawing and gnawing actions of rodents generate ultrasonic sounds that are detectable by predators. Even when a rodent is not vocalizing, predators can hear the ultrasonic sounds generated in this manner and locate the prey even when hidden under snow and leaves.

Ultrasonic sounds are more easily deflected and reflected by ordinary moisture in the air. Similarly, ultrasonic waves are more likely to reflect off rocks and trees. The net effect is that ultrasonic components of an animal sound is less directionally-focused and acts to fill a wide area. Such transmission properties of ultrasonic sounds may thus alert target predators that a desired prey is in close proximity, making it easier for a hunter to acquire the target predators.

Even when animals are vocalizing in what appears to be the audible range, ultrasonic harmonics (as when two frequencies combine to form a third frequency) may be created via a flute-like effect within the animal's windpipe. Because ultrasound tends to blanket a wide area, the ultrasound can alert a predator to the presence of prey (such as, for example, a rodent), even when the rodent's squeak is directed away from the predator. This is also how larger animals such as deer generate sounds in their windpipes with ultrasound components, in order to call or communicate with others in a herd.

Therefore, providing an apparatus with the ability to generate ultrasonic sounds can maximize the authenticity of such sounds, making hunting target animals more efficient. With that said, generating ultrasonic sounds using currently available acoustic technology is neither easy nor obvious, because the vast majority of sound recording and playing equipment is designed for frequencies within the human hearing range, and in fact the equipment is specifically designed to eliminate ultrasonic sounds in the recording and play back processes.

The electronic game call apparatus functions to attract an animal closer to a hunter. This function operates at long distances sometimes a mile or more, to gain the attention of the target and draw the target close to the hunter. Typically, the sounds mimic three sound types: food (prey), a potential mate or territory protection. In particular, these may be sounds the prey typically makes including: sounds of a distressed or hurt prey (indicating to the target an easy meal); sounds generated by the environment when the prey moves (for example, sounds of gnawing, or claws on ice or leaves); sounds the prey purposely makes when attempting to attract a mate or indicate the presence of food or other warnings. Further, sounds that replicate the sound of female target animals that indicate "in season", distress, or lost from the herd, that attract male targets to the area to investigate the potential for a mating event. Territory protection sounds are replicated of a male target animal, that attracts a dominant male target to the area to protect its territory or harem from an outside male. Some of the sounds replicate the sounds made by activities associated with males marking their territory, such as scraping, or sounds of two males conducting battles, as in antlers clashing, both inciting a target male to approach the area to protect his territory.

The electronic game call apparatus may also function to draw a target animal into an open area. By placing the animal call apparatus in the open, the target animal is drawn out into a field or other open area allowing a clear shot by the hunter, where otherwise, the target animal would remain hidden in brush or trees. Further, the apparatus may cause a target animal to focus on a sound. Here, the sounds generated by the call cause the target animal to focus on the source of the sound, thereby diverting the attention of the target animal away from the sounds and smells of the hunter.

The electronic game call simulates more closely what the target animal is actually expecting to hear; that is, a more realistic sound reproduction. This enhanced sound production includes sounds generated by potential prey that humans cannot hear. For example, the small windpipe of rodents is used like an ultrasonic dog whistle, when rodents communicate among each other. The throat and beak of birds generate ultrasonic frequency sounds when under stress despite the fact they cannot themselves hear the high-pitched sounds. The sounds of the claws of rodents across leaves, snow and ice generate high frequency sounds. In addition, distressed and hurt birds, rabbits, and rodents generate significant ultrasonic sounds in their "voiced distress calls", which target animals use in locating the prey. In particular, the sounds may include sounds of distressed, lost, feeding, and/or mating animals.

High frequency sounds above the normal hearing range of humans, but which are audible by target animals, are used by target animals for identification of prey and for locating that prey according to the phase and time shift in the sound wave. These phase and time shifts are perceived by the left and right ears of the target animal, thereby providing information as to the sound's direction as well as the distance/location of its source.

In general, the electronic game call apparatus includes a Micro-processor/Digital Signal Processor with a circuit element for decoding the digital computer file of the sound into a format that can be converted into an analog signal. A Digital to Analog Converter is also included for converting the decoded digital information into an analog signal that ultimately can be heard by the target animal. Further, filter circuitry or software that limits the range of the output analog signal to match the performance capability of the associated amplifier and speaker is also provided. It may be low pass, which reduces or eliminates frequencies below a desired frequency, or high pass, which reduces or eliminated frequencies below a desired frequency, or a combination of both, or no filters are used. A memory component, i.e. recordable memory media, is provided for storing the pre-recorded sounds as a computer like file that is decoded. Further, an amplifier component and circuitry that converts a low-level signal is provided increase the power of low level audio signal to be compatible with the audio output devices (speaker and ultrasonic sound emitter). The signal is then transferred to a speaker or sound emitter for converting the sound's electrical signal to sound pressure waves that can be heard. Batteries or other electrical power sources are also provided. Controls including buttons and/or radio transmitter/receiver are provided for consumer use to command the apparatus as to what sounds to play, the duration and volume thereof, and/or other commands as included such as enabling the auxiliary decoy output, lighting, power source selection, etc. Sound files such as digital files containing the information and data for the prerecorded sound may comprise traditional file structures, such as .WAV. .MP3, or PCM, or may be stored by a propitiatory method. It should be understood by one skilled in the art that the type of file structured disclosed herein are not intended to be limiting, as additional file types may be used. Further, codes and/or instructions that may be embedded in the sound file data or header information to direct the microprocessor/digital signal processor how to decode the specific sound file are provided.

FIG. 1 shows electronic game call apparatus 5 with an audible speaker covered by speaker grill 18 and an ultrasonic sound emitter, such as an annunciator 25. The ultrasonic sound emitter may also be a piezoelectric speaker or other device capable of emitting ultrasonic sounds. Electronic game call apparatus 5 includes a housing 12 having an exterior made of a durable material, such as molded plastic. Housing 12 fits within a tote bag 14. Tote bag 14 comprises straps to facilitate transport of the speaker. In addition, the camouflaged fabric of tote bag 14 blends in with outdoor environments such as wooded areas, fields, and the like.

Figure 2:
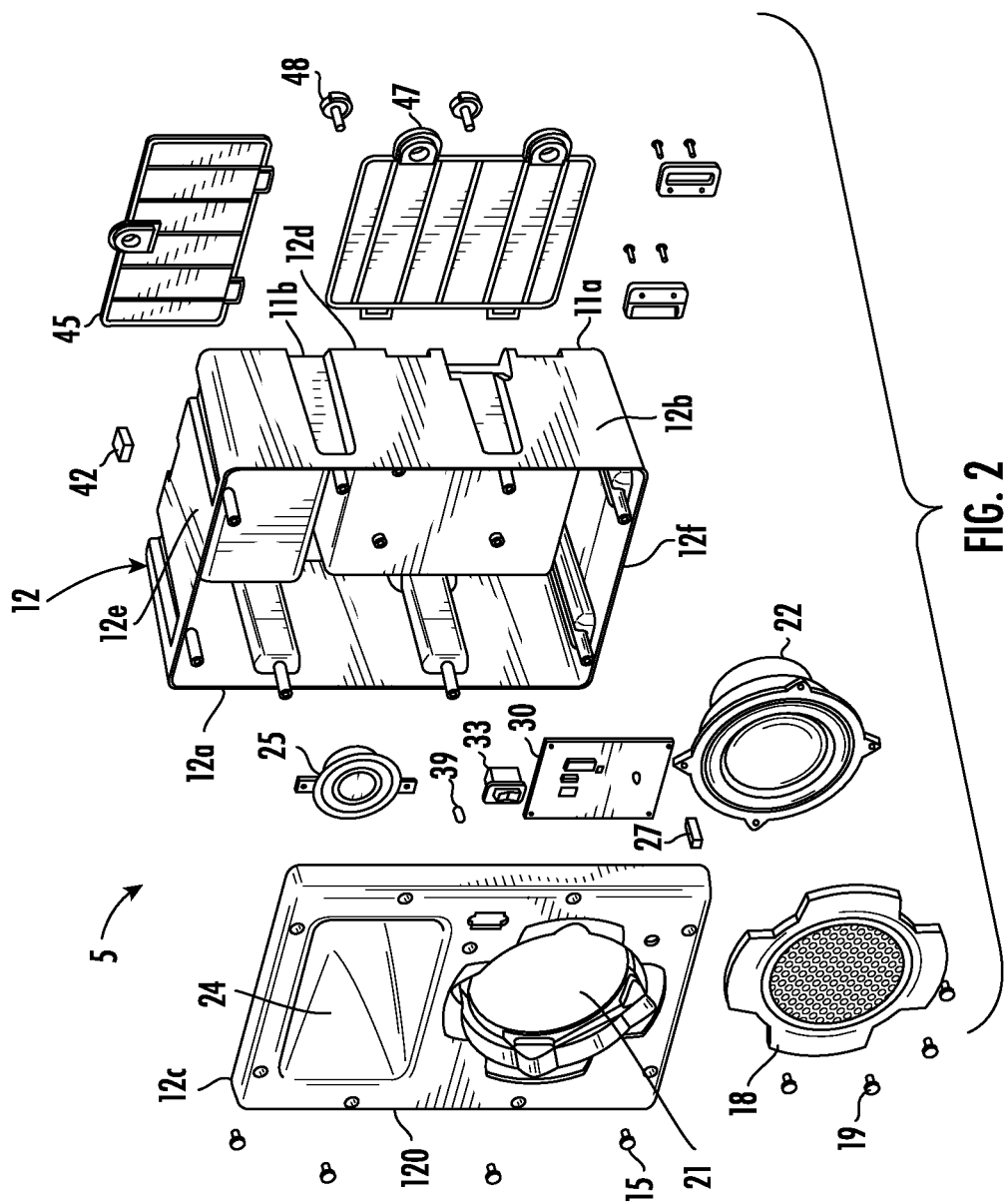
FIG. 2 shows an exploded view of a speaker box used with an animal call apparatus.

FIG. 2 shows an exploded view of the elements that make up game call apparatus 5 disclosed herein. Housing 12 includes a first side 12a, a second side 12b, a front face plate 12c, a back panel 12d, a top side 12e, and a bottom side 12f. First and second sides 12a and 12b each include a pair of molded exterior grooves 11a and corresponding ribs 11b, which act to strengthen housing 12. Front face plate 12c is fastened to housing 12 via a first fastening means 15, which may comprise screws, bolts, pins, dowels, or any other common fastening means known in the art. Front face plate 12c comprises a first opening 21 and a second opening 24. A speaker grill 18 positioned over first opening 21 provides protection to an audible speaker 22 that is positioned on an interior side of front face plate 12c so as to coincide with first opening 21. Speaker grill 18 is fastened to housing 12 via a second fastening means 19, which also may comprise screws, bolts, pins, dowels, or any other common fastening means known in the art. An ultrasonic annunciator 25 is also positioned on an interior side of front face plate 12c to coincide with second opening 24. A 3.5 mm jack 27 is located on front face plate 12c to allow connection to and control of other apparatuses, such as a mechanized decoy. In addition, game call apparatus 5 contains a printed circuit board 30, a rocker switch 33, and an LED indicator light 39. A back panel 12d of housing 12 comprises a USB connector 42. Back panel 12d also includes rechargeable battery door 45 and a non-rechargeable battery door 47. Both doors are fastened to back panel 12d via a plurality of knob screws 48. Rechargeable battery door 45 allows access to a rechargeable battery pack (not shown). Similarly, non-rechargeable battery door 47 allows access to a set of conventional batteries (not shown).

Figure 3:
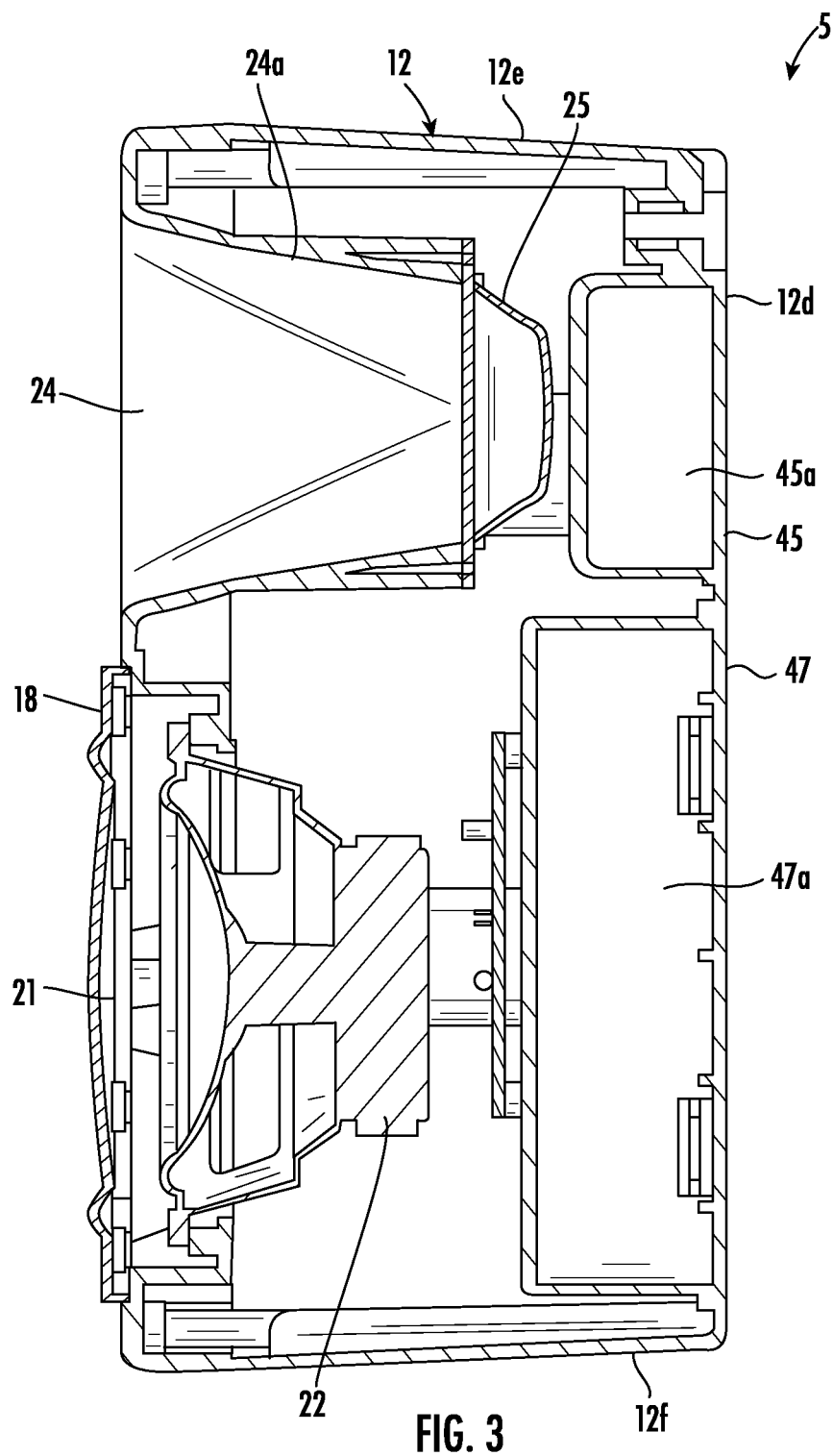
FIG. 3 shows a cross-sectional vied of a speaker box used with an animal call apparatus.

FIG. 3 is a cross-sectional view of game call apparatus 5 is shown including first opening 21, adjacent speaker 22 and second opening 24, adjacent ultrasonic annunciator 25. Also shown are rechargeable battery box 45a and non-rechargeable battery box 47a. Ultrasonic annunciator 25 includes an annunciator horn 25a. The curvature of annunciator horn 25a may vary in order to optimize sound emanating from ultrasonic annunciator 25.

Figure 4A:
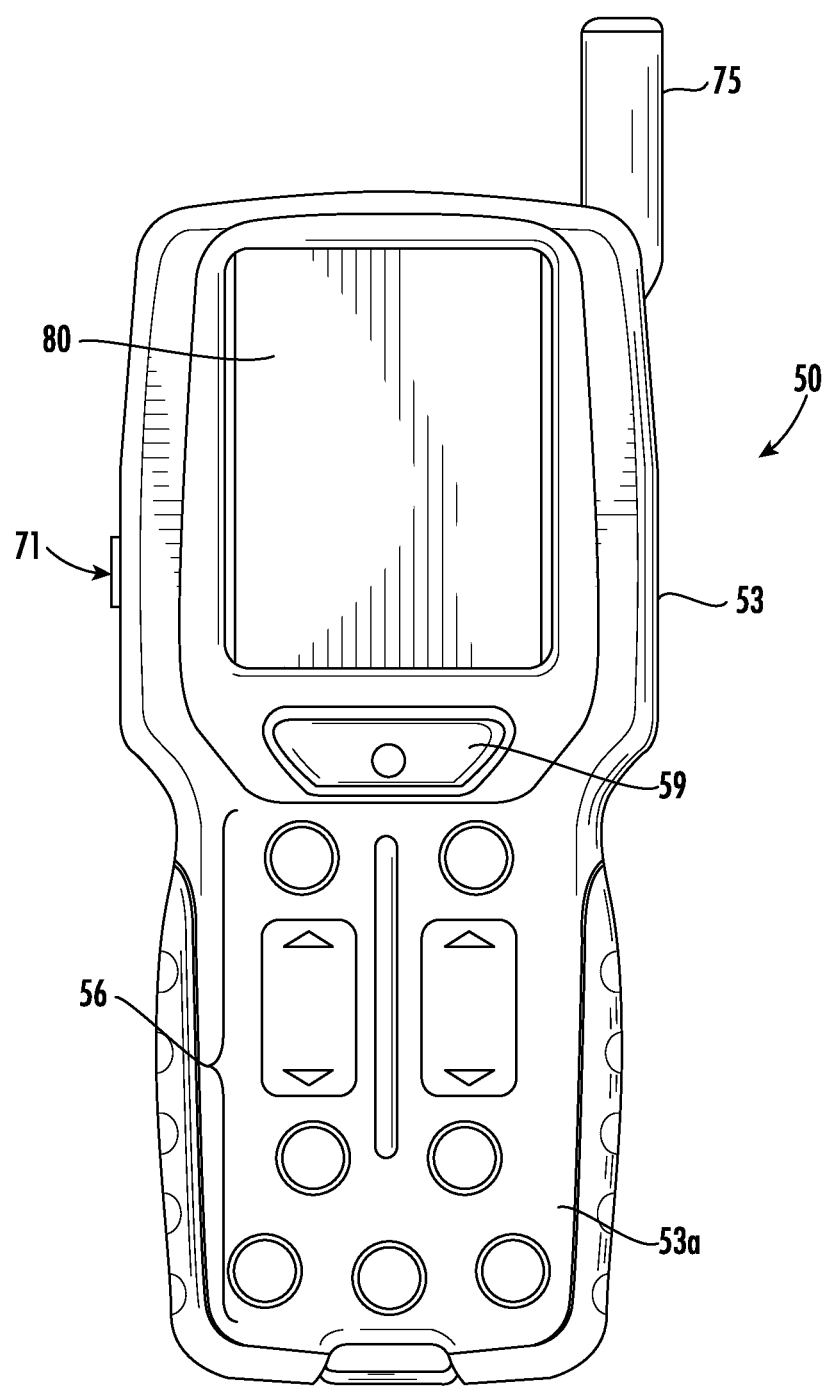
FIG. 4A shows a front view of a user interface of the animal call apparatus.

FIG. 4A shows a front view of a user interface. In the embodiment shown, the user interface is a remote control 50, which may be used with the animal call apparatus disclosed herein. In other embodiments, the user interface may be incorporated within game call apparatus housing 12 and may include an on/off button, a multi button control, or other control buttons, switches or actuators. In some embodiments, the user interface may be a smart phone or tablet. Remote control 50 includes a housing 53 comprising a housing front face 53a and a housing back. Front face 53a also includes a display 80. Display 80 is electrically connected to a display light button 71 located on the side of housing 53. Housing 53 also comprises an RF antenna with cover 75, an on/off button 59, and a multi-button control pad 56. Remote control 50 measures about 2 to about 5 inches in width. In addition, display 80 measures about 2 to 5 inches in height and about 2 to 4 inches in width.

Figure 4B:
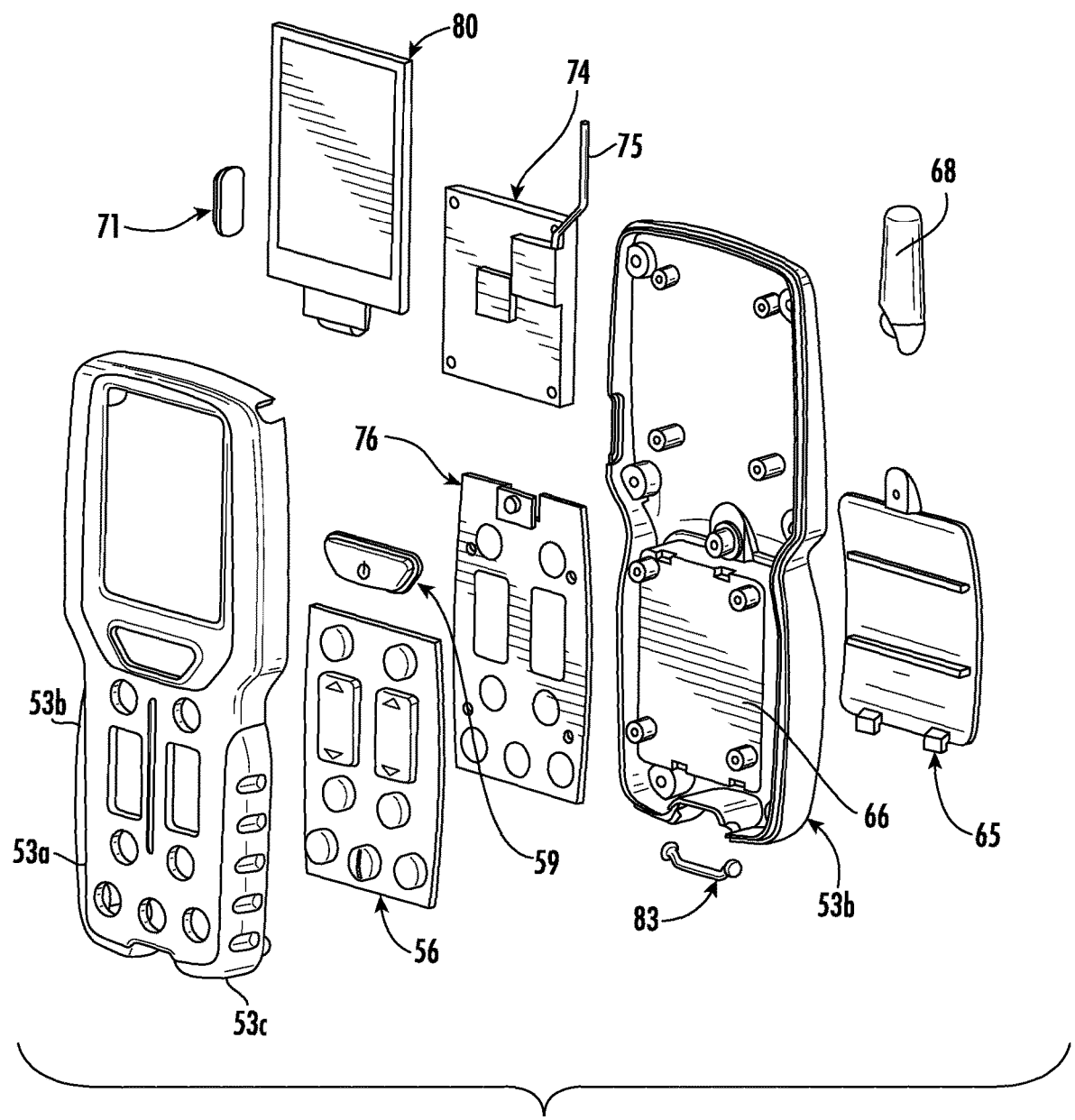
FIG. 4B is an exploded view of the user interface of FIG. 4A.

FIG. 4B shows an exploded view of the remote control 50 of FIG. 4A. A button pad 56 is positioned behind housing front face 53a. A housing back 53b includes a battery door 65 covering a battery box 66, as well as an antenna cover 75. Also contained within the housing are first controller printed circuit board 74, and second control pad circuit hoard 76. RF antenna 77 and microprocessor are attached to controller printed circuit board 74. A clip 83 is also shown for attachment to housing back 53b.

The following describes multiple methods of recording, storing, and playing back audible and ultrasonic sounds, which may be utilized with the current game call apparatus. The primary source for ultrasonic sounds is recordings made with a microphone capable of recording ultrasonic audio. Most microphones record only in the audible range. Thus, recording ultrasonic sounds requires an ultrasonic capable microphone.

After recording the sounds, the sounds are digitized at sample rates at least twice the desired frequency (called the Nyquist rate) to avoid distortion (also called aliasing). Required sample rates typically range from about 50,000 samples per second (or more) for frequencies above the highest range of human hearing (approximately 20,000 Hertz). Some recording equipment can record at about 198,000 samples per second. However, equipment that records at lower sampling rates may also be used. Common sample rates may range from about 50,000 to 150,0000 samples per second. More specifically, common sample rates are about 64,000 and 88,200 (twice that used for standard audio compact disc), 96,000 and 128,200 samples per second.

Subsequently, the digitized sounds are stored on appropriate storage media. The sounds can be stored in any one of various standard formats, including MP3 and .WAV files. The .WAV sound file structure includes information in the header of the file (i.e., metadata). This area is used to note information that identifies the recording such as type of target animal sound, date of recording, or other pertinent information about the file. It can also be used to save playback specific information that can read by the microcontroller for determining what method or methods may be used in the sound recreation process.

In an alternative embodiment, creating animal sound recordings with ultrasonic components may be accomplished by using previously-recorded animal sounds that are not recorded with equipment capable of the higher sampling rates discussed above. These previously-recorded sound files may be supplemented to include ultrasonic sound elements by adding previously-recorded ultrasonic animal sounds (recorded at the higher sampling rates), and manually adding this ultrasonic component to the original animal sound files. This process entails use of sound editing software tools. Sound files may be updated using a USB connection and/or a wireless connection to a computer, tablet or smart phone.

This embodiment requires analyzing the original sound files to reveal possible areas in the original audible-only animal sound file where mixing in ultrasonic components will enhance the original recording. For example, frequency peaks indicative of a screeching sound, which would normally have ultrasonic frequency components in a full range recording, represents such an area. Since there is an abundance of existing audible range animal sound recordings, using this method of adding ultrasonic enhancements to existing sound files provides a means of obtaining a library of full range animal sounds without having to re-record the animal sounds.

In addition, optimization of sound may be achieved by utilizing the inherent properties of speakers. That is, a first embodiment of the animal call apparatus disclosed herein may include a single speaker. This embodiment may comprise a single wide-range speaker, or an annunciator. This embodiment also utilizes a single amplifier. When a single wide-range speaker and amplifier is used, the apparatus is capable of reproducing sounds in the human audible and ultrasonic range. The computer sound file used in this embodiment may be stored and played as a single channel. In addition, a stereo sound file may also be utilized. In particular, the file may be decoded such that the two-channel stereo file is converted into a single mono output. Alternatively, only one channel of the stereo channel file may be played through the single speaker or annunciator.

A second embodiment disclosed herein comprises a two-speaker system. In this embodiment, one speaker may have a playable range centered in the human audible range and a second speaker or annunciator may have a higher frequency range allowing the playing of ultrasonic audio. In addition, the sound file could be a mono single channel file, where the same audio output is directed to the two different speakers, and the relative frequency response characteristics of the two different speakers permit ultrasonic sounds to emanate from the high frequency-capable speaker/annunciator. In addition, these two embodiments above may utilize filters. In particular, these filters, which limit the frequencies going to each speaker to thereby minimize distortion, may comprise either software or external circuitry.

Alternately, a specially-prepared two-channel sound file may have high frequencies directed to the ultrasonic-capable speaker/annunciator and may have audible range frequencies directed to the audible capable speaker/annunciator. Thus, a stereo two-channel sound file may have one channel directed to an ultrasonic speaker, and the second channel directed to an audible-capable speaker. This method may also include filters as discussed above.

The two speakers may be located on the same side of the housing so that their sound outputs could be additive, thus achieving a higher total sound level. Alternatively, the two speakers may be located on different sides of the housing, allowing for a total lower sound volume level, but also a more three-dimensional sound output.

A third embodiment utilizes more than two speakers. In particular, a third speaker (or more) may be added to enhance frequency range, or for an enhanced volume output, or to produce a less directional sound output. For example, a three speaker version may include a third speaker having low frequency range, such that the low frequency portions of the sound file are directed to that speaker. This embodiment is comparable to consumer audio apparatuses that have a bass, audible and tweeter speaker outputs.

Thus, there is more than one method for recording, sampling, storing, and playing back animal sounds having both audible and ultrasonic frequency components suitable for use with an animal sound decoy apparatus. FIGS. 5-9, which follow, describe several different methods of recording, storing, processing, and playing animal sound files with ultrasonic frequency components.

Figure 5:
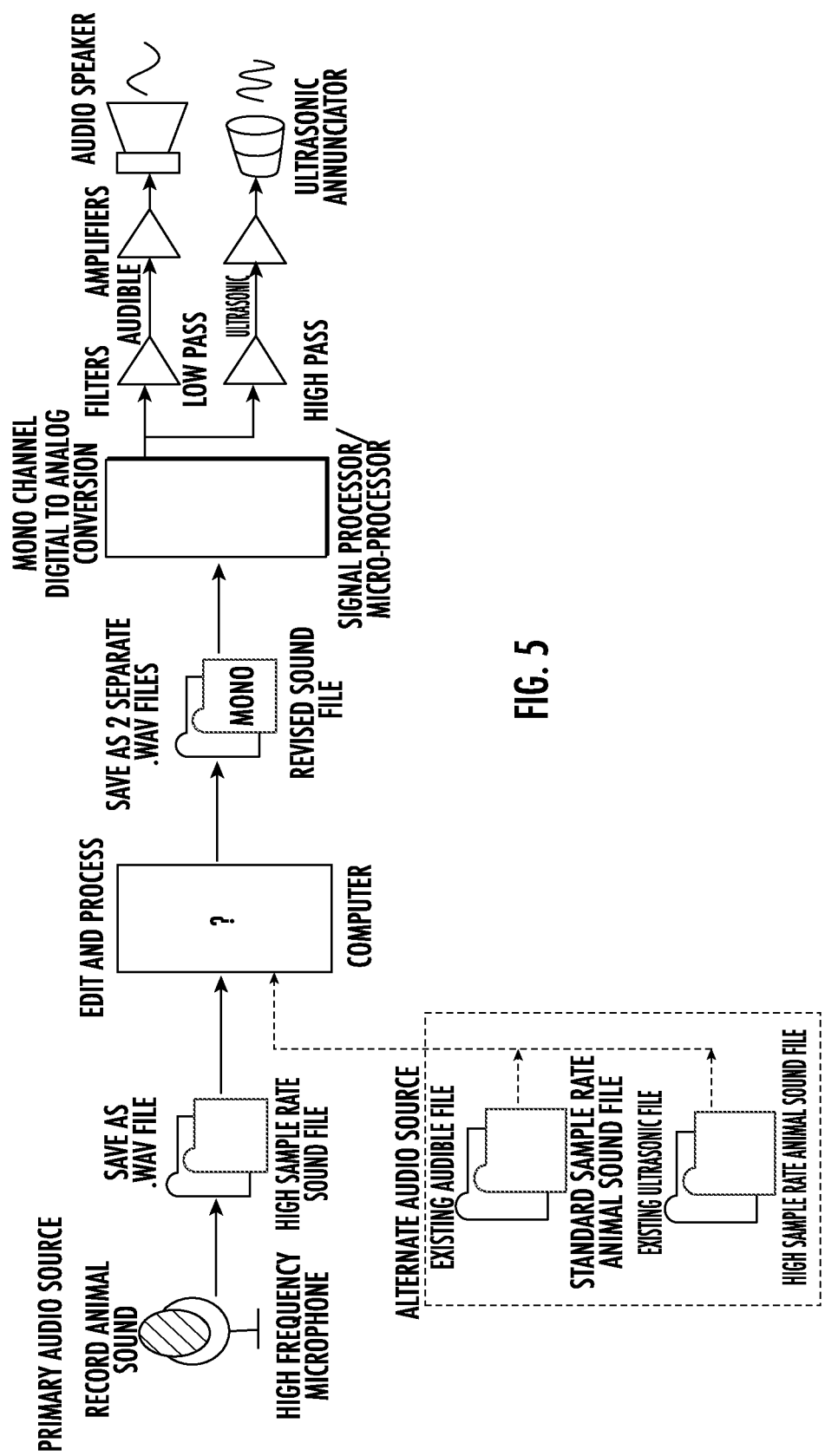
FIG. 5 is a flow diagram exemplifying a first embodiment of a record and play back method, which may be used with the current game call apparatus.

FIG. 5, for example, illustrates a first embodiment having a high sample rate, single digital channel, with low and high pass filters for two-channel audio output. A single mono file is created using audio processing computer software tools (e.g. Sound Forge and Audacity). Such audio processing software allows editing of the sound source files, management of file size, elimination of extraneous sounds (such as "clicks"), normalization of volume levels, filtering of undesired frequencies, as well as adjusting volume levels to correlate with frequency response capabilities of audio output apparatuses such as speakers. The resulting file is a single channel (mono) sound file suitable for playing from a full-range animal sound decoy apparatus.

Alternatively, resampling at a lower rate (but still above twice the desired maximum ultrasonic frequency) may be carried out to reduce memory requirements. In particular, as most of the desired ultrasonic sound is at a frequency of 40,000 Hertz or less, sample rates of 80,000 samples per second or above may be used. In one example, a re-sampling rate of 64,000 samples per second may be used for a sound file containing no significant energy above 30,000 Hertz. As mentioned above, common sampling rates range from 88,200, 96,000, and 128,000 samples per second. Thus, if a particular ultrasonic source file has little or no sound energy at higher frequency ranges, a lower sample rate may be used to further reduce memory requirements.

The mono single channel digital file is next converted to an analog audio signal using a digital to analog converter. Such an apparatus may comprise a programmed microcontroller or a stand-alone integrated circuit capable of generating high frequency ultrasonic audio. This mono-channel audio signal is subsequently exposed to two filters; a high pass filter that permits only frequencies above a predetermined frequency to pass through the filter, and a low pass filter that permits only frequencies below a predetermined frequency to pass through the filter. In particular, the high pass filter may be used to strip off the human audio range frequencies from the mono full frequency range audio signal, leaving only the ultrasonic portion. The resulting audio is then passed onto an audio amplifier circuit to raise and control the volume before it is transmitted through an ultrasonic annunciator or other ultrasonic sound emitter.

As discussed above, a low pass titer only allows sounds below a predetermined frequency to pass through the filter. This circuit may be utilized to strip off the ultrasonic components in the audio signal such that only human-audible sound is passed onto the audio amplifier circuit that drives the standard cone speaker. The frequency used as the cutoff frequency in both the low pass and high pass filter are set depending on the specific characteristics of the cone speaker and the ultrasonic annunciator. Thus, a cutoff frequency may be in the 15,000 to 20,000 Hertz range, depending on the characteristics of the speaker and annunciator. In addition, the cutoff frequency may be, but is not required to be, the same for both filters. The cutoff frequency is set to optimize sound by minimizing any distortion caused by having two different apparatuses (speaker and annunciator) playing the same audio signal at the same time.

Also, with respect to FIG. 5, though the filters are shown as separate apparatuses, frequency filtering functions could be carried out by use of software associated with a programmable microcontroller or a programmable digital signal processor integrated circuit. The volume output levels of the two different amplifier circuits may be controlled by the microprocessor per commands and programs residing in the microprocessor.

Figure 6:
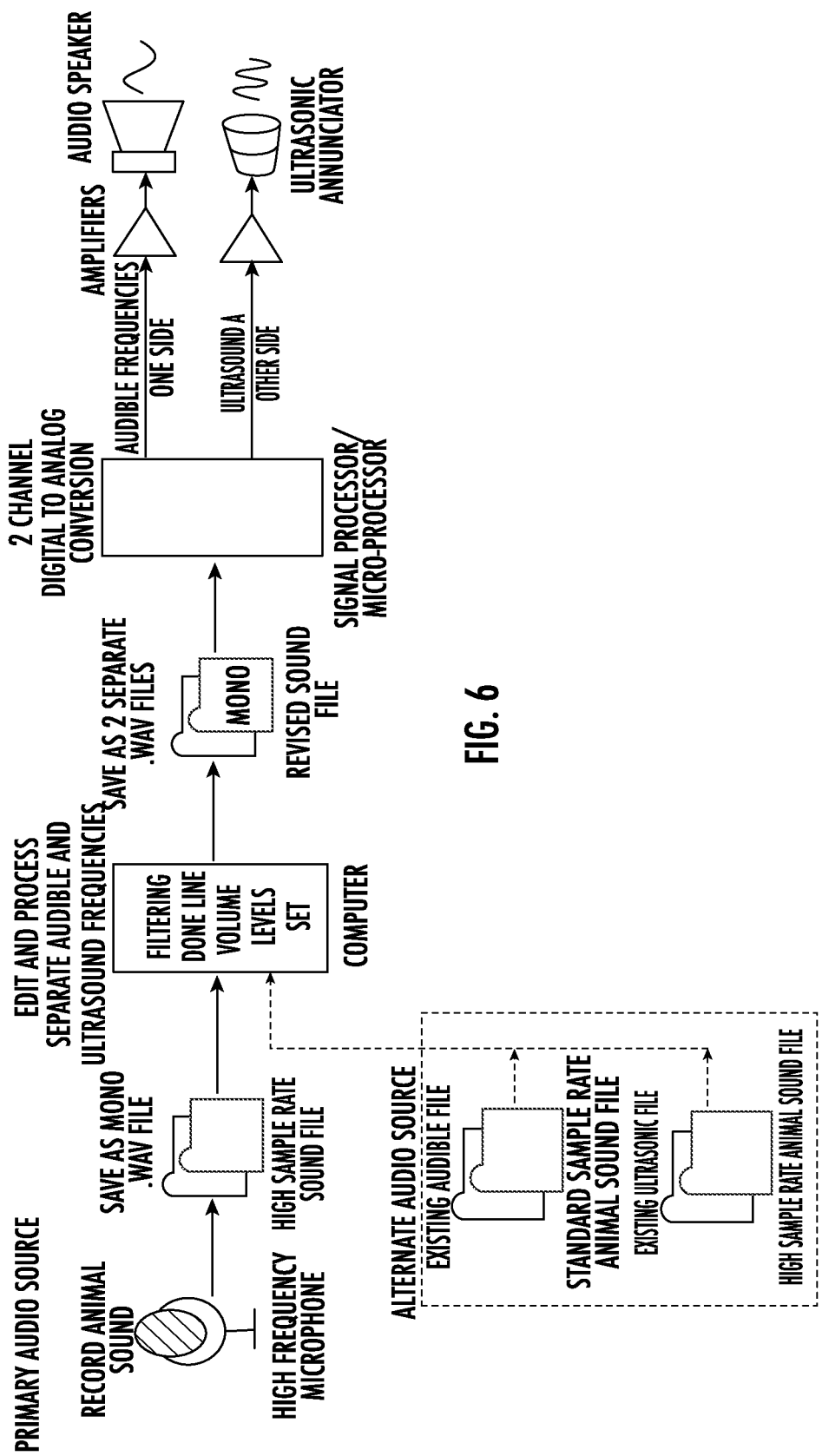
FIG. 6 is a flow diagram exemplifying a second embodiment of a record and play back method which may be used with a game call apparatus.

In FIG. 6, a second embodiment and method of recording, sampling, and playing sound is described. The second embodiment is characterized by a high sample rate and a frequency-separated stereo digital file for two-channel output. In this case, an original audio source consisting of both human audible and ultrasonic sound may be separated at the sound editing stage, creating a stereo two-channel sound file. One channel (for example, the "left" channel in a typical stereo file) may contain the human audible sound. A second channel (the "right" channel) may contain predominantly ultrasonic frequency components. This method is similar to the first method described above, but the filtering is done at the editing stage, prior to the digital to analog conversion. Also, in this method, the analog output of the analog to digital converter is a stereo signal. That is, one side of the signal is audible, and a second side of the signal is ultrasonic. Each signal is routed through an associated audio amplifier circuit followed by a playing apparatus (an audible sound emitter for the audible channel, and an ultrasonic sound emitter for the high frequencies channel). The filtering and volume levels are set in the editing process to maximize quality of the resulting sound.

Figure 7:
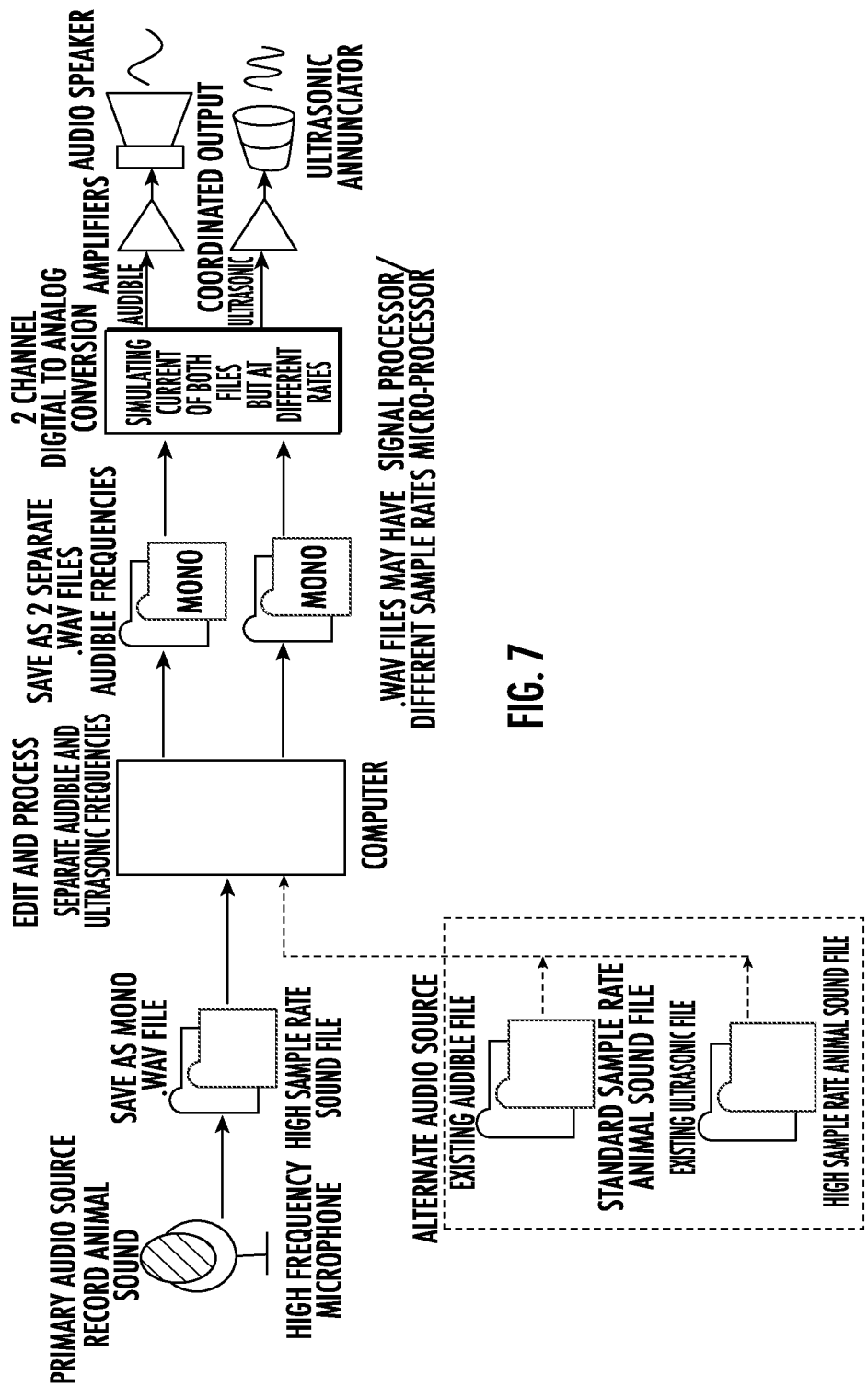
FIG. 7 is a flow diagram exemplifying a third embodiment of a record and play back method, which may be used with a game call apparatus.

In FIG. 7, a third embodiment associated with a method of recording, sampling, and playing sound is described. The third embodiment utilizes one high sample rate file containing ultrasonic data and a second lower sampling rate sound file containing audible data, played simultaneously for two-channel audio. This embodiment is similar to the second embodiment, but instead of using a single two channel sound file, the sound source is separated into two separate mono digital sound files; one being the ultrasonic portion saved at a high sample rate and the second being the audible portion saved at a lower sampling rate. In this way, the size of the audible portion will be substantially smaller resulting in lower total required memory to save and play this specific animal sound. In Method 3, the digital to analog conversion of both files occurs simultaneously, but at different rates, resulting in a coordinated analog output to the respective audio amplifiers and sound output apparatus.

Figure 8:
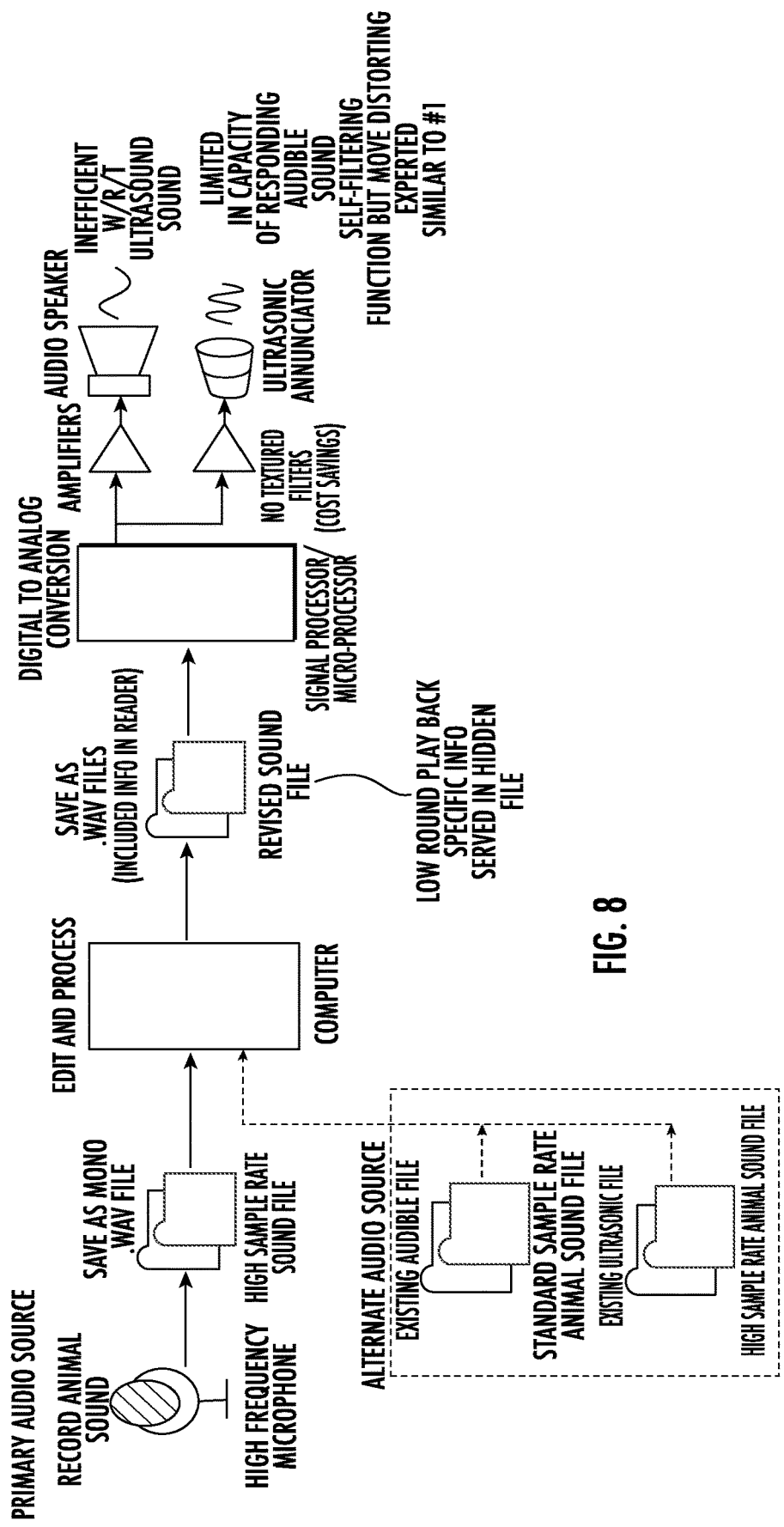
FIG. 8 is a flow diagram exemplifying a fourth embodiment of a record and play back method, which may be used with a game call apparatus.

FIG. 8 illustrates a fourth embodiment of a method of recording, sampling, and playing sound. In particular, the fourth embodiment uses a single track audio played through both high frequency and low frequency output apparatus. That is, the fourth embodiment utilizes one high sample rate mono digital file containing the full frequency range audio data played with either a single channel output from the analog to digital converter split and connected to both audio amplifier inputs, or, the digital to analog converter output is two-channel, with each channel connected to either an ultrasonic sound emitter amplifier, or to an audible auditory amplifier.

This embodiment is similar to that of the first embodiment above. However, no active external filter circuit is used. Instead, this method uses the fact that the cone speaker is inefficient at reproducing the ultrasonic sounds and the ultrasonic annunciator is limited in its capability of reproducing audible frequencies. Thus, by playing the same full frequency audio through both the speaker and the annunciator, the limited frequency characteristics of these output apparatus creates a self-filtering function. Regarding this embodiment, there is a cost savings in eliminating the external filter circuitry, but the risk of additional distortion and higher noise level as compared to including one or more external filtering apparatuses, is also a possibility. However, this distortion may nonetheless be tolerable and an acceptable tradeoff between reduced sound quality, versus lower cost.

Figure 9:
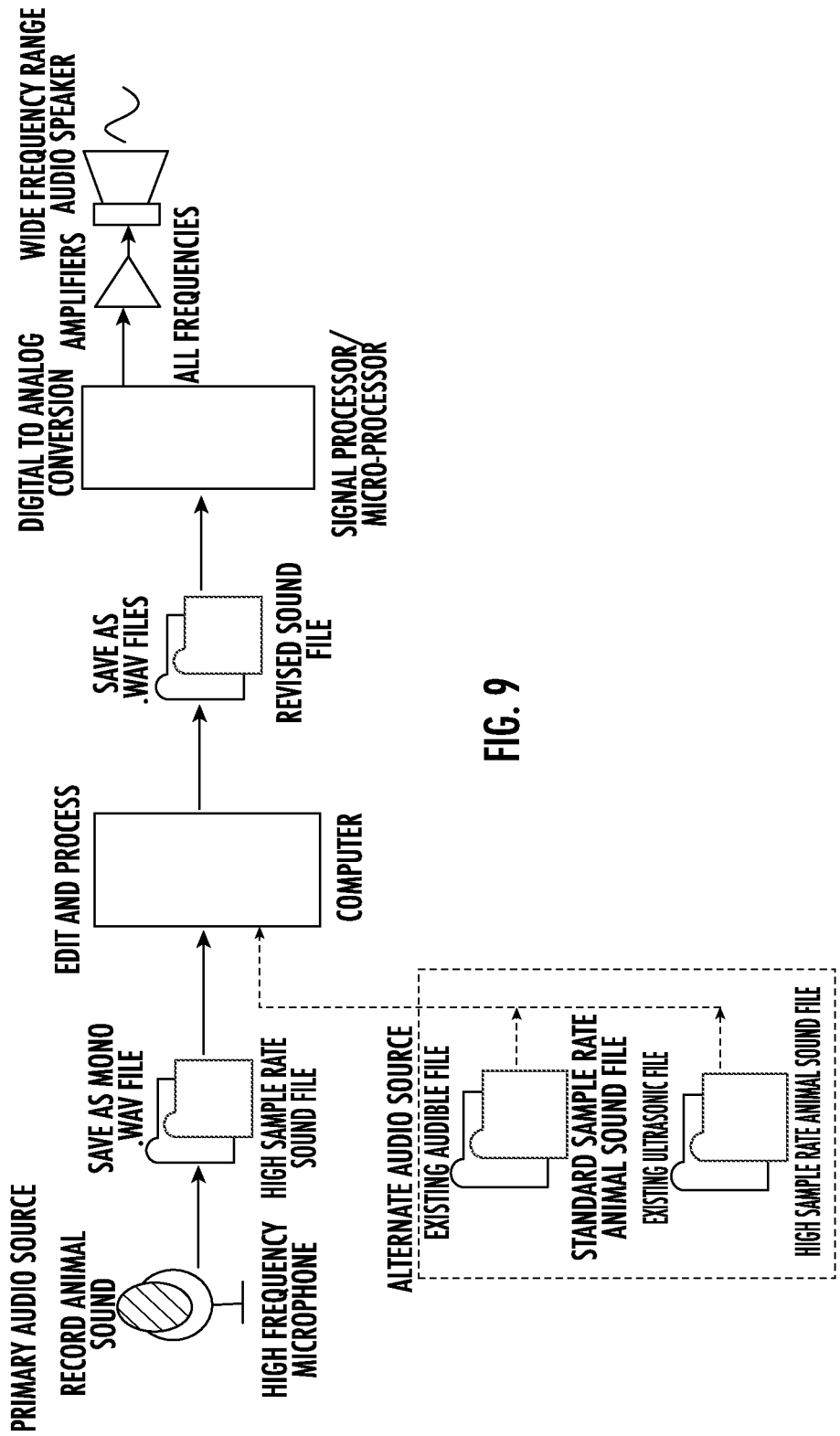
FIG. 9 is a flow diagram exemplifying a fifth embodiment of a record and play back method, which may be used with a game call apparatus.

FIG. 9 illustrates a fifth embodiment and method of recording, sampling, and playing sound. The fifth embodiment uses a single track audio played through a single output apparatus having wide frequency capabilities. In particular, FIG. 9 shows one high sample rate mono digital file containing the full frequency range audio data played with a single channel output from the analog to digital converter to a single audio amplifier input connected to a single wide frequency range speaker.

Example 1

Sounds may be recorded digitally and stored as .wav files. These recordings are then transferred to an original recording file and then to computer where the sound processing will occur. The processing procedure is as follows:
  (1) Open the recorded sound file in the sound processing program.
  (2) Display the waveform of the file on the screen.
In most cases, the sound file is "rough cut" if it is recorded using live animal sounds. That means it contains a continuous recording of which might include clicks, pops, dead space, as well as people talking, etc.
  (3) Make a visual inspection of the waveform, looking for areas with most probable best animal sounds.
  (4) Move and listen to the identified areas.
  (5) If the section contains usable sounds, copy and paste into a new file. Do this for multiple sections until an adequate amount of high quality sections are saved as separate files.

It is possible that multiple calls will be made from one original recording. For example, a distressed rodent may be on the same original recording.

(6) Select the best candidates from the saved files for making the final sound files.

(7) Arrange, in a temporary file, the saved segments in the order desired to get the best final product. The final product may take small pieces of the original recorded files and then recombine in different ways, such as re-ordering the original sequence, repeating certain sections, controlling the pacing by adding silence, or stretching the sound. This process may even involve taking sounds from other recordings and adding to the temporary file.

Generally, the final call length is 10 to 30 seconds. Thus, the pieces of sound must next be assembled together to fit within this time range.

(8) Listen again to each candidate segment.

(9) Edit to eliminate pops and sound imperfections and cut the files to eliminate any extra sounds.

(10) Run through a noise filter to remove any hiss that might be original recording. (Different segments may require different configurations of a noise filter).

(11) Match the volume levels across all the segments, so the highest volume is consistent. This is done by raising or lowering the volume over a large segment or editing small portions. When cutting and pasting sound segments together to insure a smooth transition. This can be done by fading in and out or mixing at the area of the transition from one segment to the next.

(12) Listen for any bad artifacts from the editing process and manually fix those.

(13) Then, raise the combination that has been made so it barely reaches the maximum volume to insure the loudest play possible. Fix any area where clipping (going over the maximum volume) occurs.

In some cases, the lowest volume section may require additional amplitude so that these sounds can be heard relative to the loudest sounds.

(14) Next, the frequency response of the input apparatuses is reviewed (e.g., the microphone, recording equipment, etc.), as well as the output apparatuses (e.g., the amplifier, speaker, and housing). The file must be modified to compensate and/or calibrate for the real life frequency/actual response of these components.

For example, most speakers do not play a flat volume level for all frequencies. Thus, frequencies where the speaker is highly efficient will generally be too loud, and conversely, if the speaker has frequencies where it is less efficient, it will generally be too low. Using a tool called EQ (equalization), the file can be modified to take into consideration the lack of flat frequency response of all the input and output apparatuses. Selected frequency ranges can be amplified or decreased, so the final sound output plays the sound as if all elements of the apparatus have a flat frequency response.

If the case of the ultrasound product that will play two separate files through two different speakers, this step is carried out after the file has been split into two files, one file for the human audible speaker, and the second file for the ultrasound speaker as each speaker has a unique frequency response. The two files are then also adjusted so the output of one speaker is at the same level of the other speaker.

Next, the file is optimized by frequency range. That is, the high frequency ultrasound file is run through a high pass filter to remove the frequencies below a given cutoff of frequency. Similarly, the file for the audible speaker is filtered with a low pass filter, so frequencies below a predetermine cutoff frequency is removed.

It is expected that both files will have some shared frequencies where both speakers will play the same sound. In this shared area, the volume of the shared frequencies is reduced, so when played, the net result is a flat, consistent volume. This shared area reduces the distortion that often occurs when trying to play sound files that are cut severely at a given point.

Editing the ultrasound file has a unique challenge because humans cannot hear sounds at ultrasonic frequencies. Thus, in order to edit an ultrasonic file, the entire file may be pitched down so it can be listened to by an engineer. For example, a sound at 30,000 hertz would need to be pitched down by at least three times to be audible for editing (that is, the sound would need to be pitched down from 30,000 hertz to 10,000 hertz to be heard). Editing for imperfections can thus be accomplished by using the down-pitched file, and subsequently, the file is pitched back up to return the file to its original range.

All the editing above is done at the high sample rate of the original recording. To play the sound through the actual game call apparatus, the entire file must be resampled at the lower sample rate set by the software of the game call apparatus.

Before resampling, an initial spectral analysis is done on the file. This analysis shows the relative power at the full frequency range and indicates the lowest frequencies that should be removed to prevent distortion after resampling.

Another consideration is the Nyquist frequency. Regarding the Nyquist frequency, the highest frequency allowed in the file has to be at least half the frequency of the final sample rate to prevent distortion from aliasing. With respect to the current product, the expected play back rate is 88,200 hertz, meaning all sound above 44,000 hertz must be filtered. The limitation of 44,000 hertz has no negative impact on the effectiveness of the apparatus as the expected target animals have little to no hearing capability above 44,000 hertz.

The file is next run through a "brick wall" high pass/low pass filter to delete all sound outside the desired range, and the file is then resampled at the play rate. The two resulting files (one for ultrasonic and one for audible sounds), are re-examined visually and by human ears for any undesired residual effects from this final editing process. Additional editing may be required.

Example 2

In another embodiment, sound files for storing and playing sounds containing ultrasonic elements may be produced by:

(1) recording original sounds with high frequency/high sample rate equipment;

(2) editing and mixing in ultrasonic audio data into a sound file not originally recorded with ultrasonic equipment; and (3) playing two separate sound files simultaneously; one file containing audible sound data and a second file containing ultrasonic sound data.

Further, the animal call apparatus disclosed herein may utilize one or both of primary (non-rechargeable) and/or rechargeable batteries. Primary (non-rechargeable) and rechargeable batteries have different chemistries. In addition, each battery type has different current capabilities as the batteries are depleted.

With respect to one embodiment of the animal call apparatus disclosed herein, it may be adapted to work with only one type of battery (i.e., primary/non-rechargeable batteries or rechargeable batteries). In this embodiment, a microprocessor will constantly monitor voltage level of the batteries and adjust the maximum volume level of the audio output to keep the current requirements of the entire system from exceeding pre-determined maximums, so as to avoid damage to the battery cells and to maximize battery life.

In one variant of adjusting volume, only the volume peaks in the audio are reduced. The audio portions below the maximum peaks are not adjusted. According to a second variant of adjusting volume, certain sound frequencies (based on the specifications of the speakers), may require more current than other frequencies. These high current frequencies are reduced in amplitude in order to optimize battery functionality.

Some sounds produced by the animal call apparatus disclosed herein are of a type where loudness is key to producing an authentic target animal sound (e.g., a coyote howl). In these cases, the volume level of sounds played through the high frequency annunciator are reduced to allow the high volume sounds to be played primarily with the audible speaker for a net louder sound when current limits are imposed. Codes in the sound file can designate "high-volume" sound file.

In another embodiment, the animal call apparatus disclosed herein may have capability for both primary and rechargeable batteries to be installed at the same time. In particular, the apparatus may have two separate battery compartments such that only primary cells will fit into one of the compartments and only a rechargeable battery pack will fit into the second compartment. A portion of electronic circuitry is located between the batteries and the rest of the electronics. This power selection circuitry automatically selects which battery type will provide the electrical power to the main electronics based on which type of battery is installed and whether the voltage levels of the batteries exceeds a minimal threshold level. If both battery types are installed and charged, circuitry defaults to a pre-programmed selection. In the majority of scenarios, the apparatus defaults to the rechargeable batteries, but this choice is arbitrary, and could alternately be programmed to default to primary batteries. In either case, the user can change this default through commands to the microprocessor.

The microprocessor constantly monitors the voltage level of both batteries. As the batteries are depleted by use, the voltage and maximum current output of the battery is reduced. At some point, the electrical current capability of a particular battery is diminished. Subsequently, the microprocessor may cause the power selection circuitry to switch to the other type battery in order to maintain maximum sound volume level. The user is informed of the change and may override the selection and/or command which battery source will supply power.

It is possible for example, that the rechargeable batteries would initially be selected to be the power source. As the rechargeable batteries are depleted, the power selection circuitry switches to the primary (non-rechargeable) batteries, which in turn are depleted to the point that switching back to the rechargeable batteries provides for continued use of the apparatus. This switching could continue until both batteries are completely depleted. A user also may have the option to refrain from switching battery types until the initial selected battery type is completely depleted.

A user may also disconnect and replace either of the battery types at any time. The selection circuitry will compensate for the battery removal and or replacement.

Automatic Voltage Source Control

Figure 10:
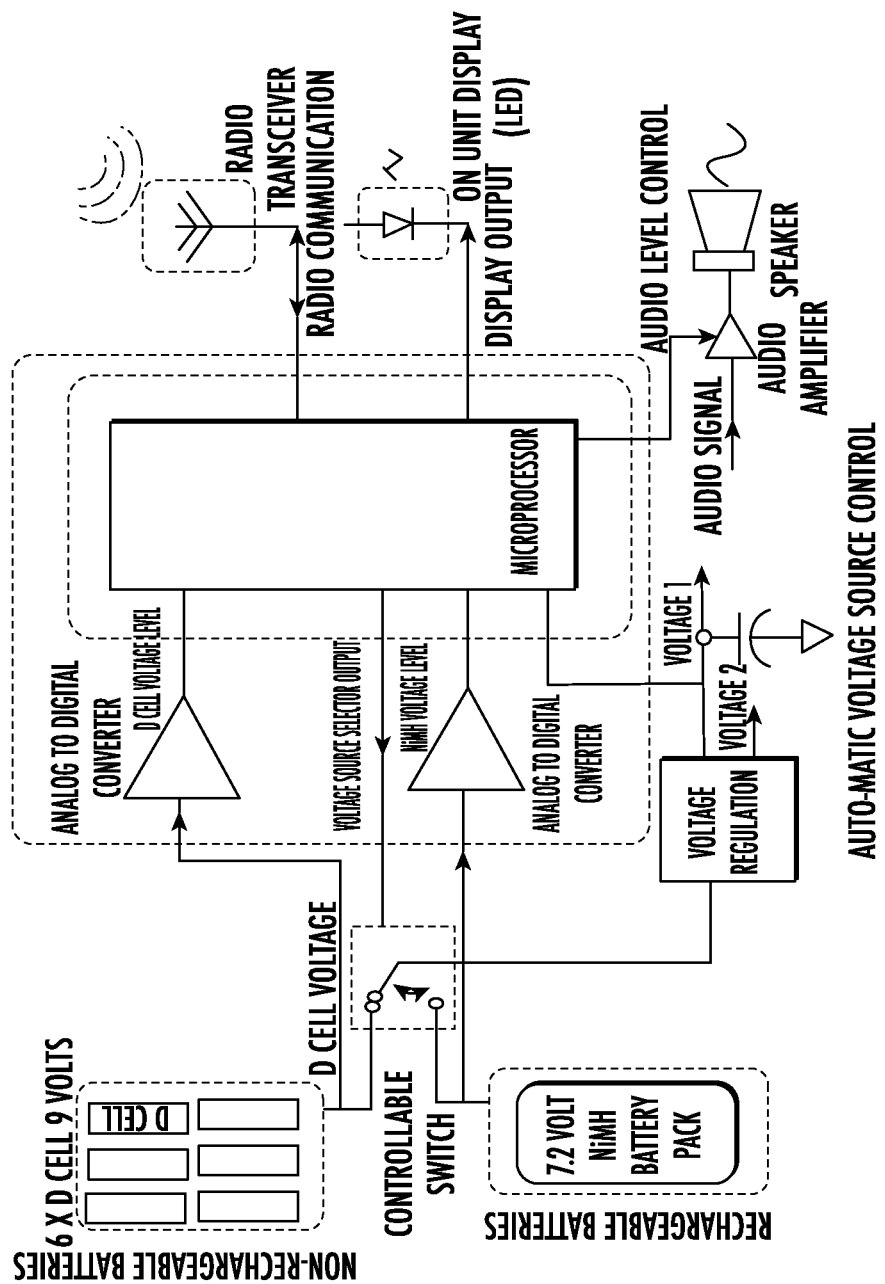
FIG. 10 is a circuit diagram of an automatic voltage source controller, which may be used with a game call apparatus.

FIG. 10 is a circuit diagram of an automatic voltage source control mechanism included with the disclosed game call apparatus. In particular, another feature of the game call apparatus disclosed herein is the ability to reduce sound volume when using non-rechargeable batteries. In order to reach the audio levels typically desired by hunters, this requires electrical current that can exceed the current capability of standard non-rechargeable alkaline batteries. Drawing too much current from alkaline batteries generates considerable heat, posing a danger to the batteries, the apparatus itself, as well as users of the apparatus. Rechargeable batteries comprising nickel metal hydride (NiMH), lithium polymer (LiPo) and lithium ion (Li-ion) have the ability to operate safely and efficiently at high power levels.

However, rechargeable batteries must be recharged before use and/or when depleted. In addition, should a hunter forget to recharge the rechargeable batteries or deplete the rechargeable batteries by normal usage thereof, recharging the batteries while on a hunting trip may be difficult. In particular, recharging batteries requires access to an electricity source, a special battery charger, and may take several hours. Therefore, the present game call apparatus allows a hunter to use easy-to-purchase alkaline batteries in those situations where the rechargeable batteries are not available, or are non-functional or otherwise cannot be recharged, or are simply depleted.

When operating the animal call apparatus disclosed herein with rechargeable batteries, the full volume level can be played by the animal call apparatus. When operating with non-rechargeable batteries, the maximum sound volume level is automatically reduced so that the current/power requirements stay within the restraints of safe operation ranges of the non-rechargeable batteries. In addition, this maximum volume level of the game call apparatus is also reduced over time, as the voltage level and current capability of alkaline batteries drops from normal use depletion.

Regarding the rechargeable and non-rechargeable batteries which may be used with the animal call apparatus disclosed herein, both or either of these battery types can be installed. Two separate battery compartments are provided. Upon apparatus activation, the hardware and software circuitry first determine the voltage level from each compartment. If the battery level from a given compartment is zero, then the apparatus senses no batteries are installed in that compartment. If both rechargeable and non-rechargeable batteries are installed, the system will default to rechargeable. If there are no rechargeable batteries installed or the rechargeable batteries are depleted, the power source for the animal call is switched to non-rechargeable batteries. This is done with a mix of hardware circuitry and a program residing in the animal call apparatus's electronics. In addition, the user may also send a command via the remote control to manually select which battery to use. If non-rechargeable batteries are manually selected, the same current limiting as above remains in effect.

The system constantly monitors the voltage levels of the batteries so that programmed logic can adjust maximum sound levels associated with switching from one battery type to another. The user is informed of the volume level limits via the user interface and animal call housing displays. In all cases, the microcontroller outputs the battery status to the user via radio transceiver to the user interface display. Battery status may also be displayed on the game call apparatus housing. For example, an LED could change color or flash at a different rate as a means to inform the user of battery status.

Figure 11:
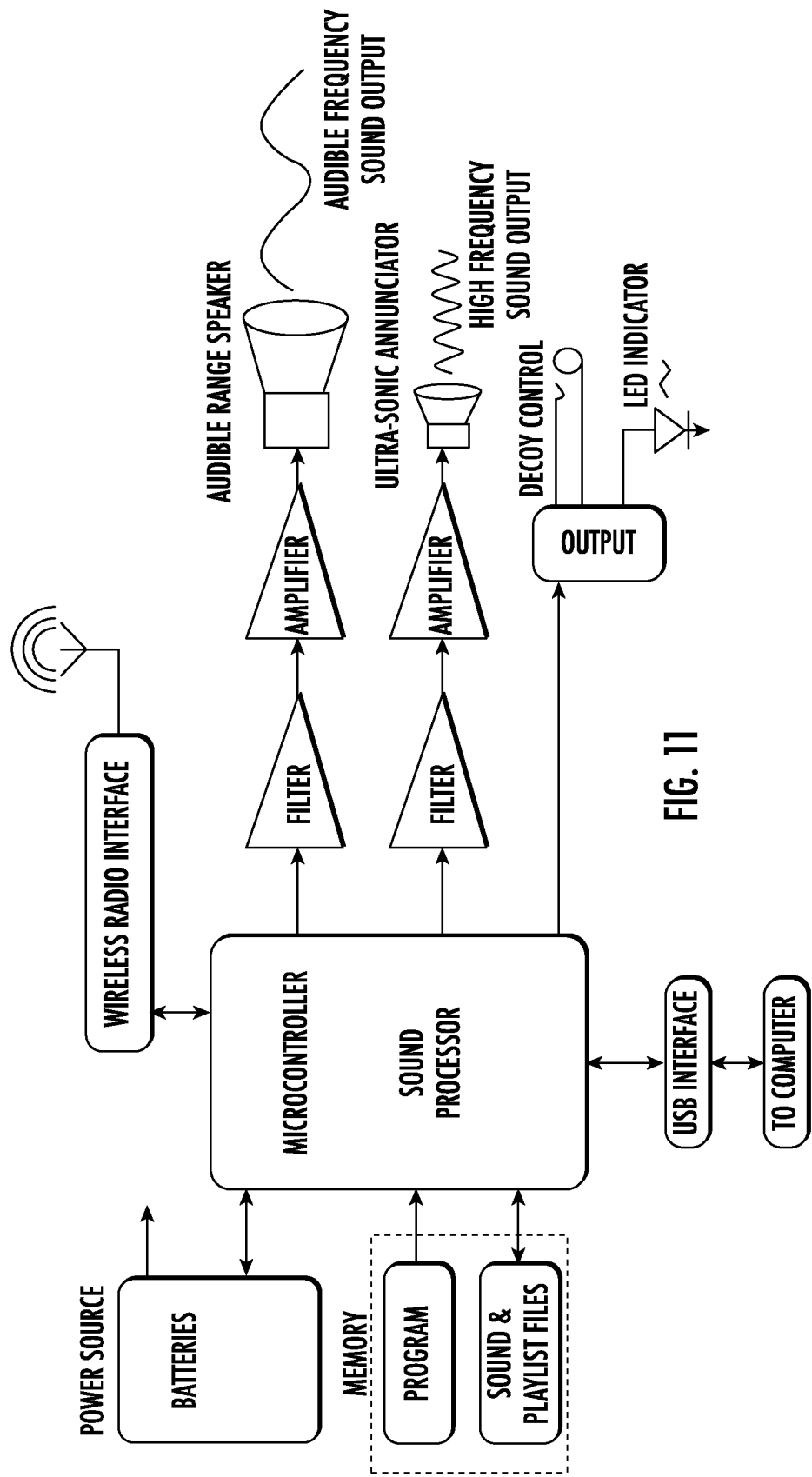
FIG. 11 is a circuit diagram of a circuit used in the electronic game call apparatus including a wireless radio interface.

FIG. 11 illustrates a circuit diagram of a circuit used in the electronic game call apparatus including a wireless radio interface and a USB interface to a computer.

While this invention has been described with reference to certain specific embodiments and examples, it will be recognized by those skilled in the art that many variations are possible without departing from the scope and spirit of this invention. The invention, as defined by the claims, is intended to cover all changes and modifications of the invention which do not depart from the spirit of the invention. The words "including" and "having," as used in the specification, including the claims, shall have the same meaning as the word "comprising."

We claim:

1. An apparatus for attracting an animal to an area, the apparatus comprising:
   at least one mono signal digital file containing an animal sound obtained by recording an animal sound with a microphone capable of recording ultrasonic audio, the mono signal digital file containing both audible and ultrasonic frequency components;
   recordable memory media containing said at least one mono signal digital file containing audible and ultrasonic frequency components a digital to analog converter configured to convert the at least one mono signal digital file to analog audio signals;
   a first amplifier connected to a first speaker having a playable range centered in the human audible range;
   a second amplifier connected to a second speaker having a frequency range allowing the playing of ultrasonic audio;
   a user interface that, when activated, plays back the mono signal digital file through said first amplifier and said first speaker, and said second amplifier and said second speaker;
   a processor; and
   memory accessible by, or residing in, said processor, said memory storing a program that, when said program is executed by said processor, said processor causes said first speaker and said second speaker to simultaneously emit said audible and ultrasonic frequency components, respectively.

2. The apparatus of claim 1, wherein said processor comprises a component of a programmable microcontroller connected to said first amplifier and said second amplifier.

3. The apparatus of claim 1, further comprising (a) a low pass filter that filters the animal sound data file and permits only frequencies below a predetermined frequency to pass through the filter, and (b) a high pass filter that filters the animal sound data file and permits only frequencies above a predetermined frequency to pass through the filter.

4. The apparatus of claim 1, further comprising rechargeable batteries for powering the apparatus.

5. The apparatus of claim 1, wherein the user interface is a smart phone or tablet.

6. The apparatus of claim 1, wherein said second speaker is an annunciator or a piezoelectric speaker.

7. The apparatus of claim 1, wherein said playable range of said first speaker is centered at 15,000 hertz or less and said frequency range of said second speaker is centered at 20,000 hertz or more.

8. The apparatus of claim 1, wherein the animal sound data file has been equalized to amplify or decrease selected frequency ranges to provide a final sound output having a flat frequency response.

9. The apparatus of claim 1, wherein the animal sound data file is a mono single channel file, further wherein said mono single channel file is provided separately to both said first speaker and to said second speaker.

10. The apparatus of claim 1, wherein said first amplifier is for amplifying audible sound in the animal sound data file and said second amplifier is for amplifying ultrasonic sound in the animal sound data file.

11. An apparatus for attracting an animal to an area, the apparatus comprising:
    at least one animal sound data file containing audible and ultrasonic frequency components;
    recordable memory media containing said at least one animal sound data file containing audible and ultrasonic frequency components;
    a first amplifier connected to a first speaker having a playable range centered in the human audible range;
    a second amplifier connected to a second speaker having a frequency range allowing the playing of ultrasonic audio;
    a user interface that, when activated, plays back the animal sound data file through said first amplifier and said first speaker, and said second amplifier and said second speaker;
    a processor;
    memory accessible by, or residing in, said processor, said memory storing a program that, when said program is executed by said processor, said processor causes said first speaker and said second speaker to simultaneously emit said audible and ultrasonic frequency components, respectively; and
    rechargeable batteries for powering the apparatus,
    wherein the apparatus further comprises non-rechargeable batteries for powering the apparatus, wherein the apparatus further comprises a power selection circuitry connected to said processor, said power selection circuitry being configured to automatically switch to the non-rechargeable or rechargeable batteries depending on which will provide the maximum power based on current sourcing capability of the non-rechargeable and rechargeable batteries at a given voltage level, and wherein said apparatus is configured to permit a user to override said power selection circuitry and manually select whether to use the rechargeable or non-rechargeable batteries.

12. The apparatus of claim 11, further comprising a battery status monitor, and wherein said processor comprises a portion of a microcontroller that is configured to output the battery status via radio transceiver to a remote control.

13. An apparatus for attracting an animal to an area, the apparatus comprising:
    at least one mono signal digital file containing an animal sound obtained by recording an animal sound with a microphone capable of recording ultrasonic audio, the mono signal digital file containing both audible and ultrasonic frequency components;
    recordable memory media containing said at least one mono signal digital file containing audible and ultrasonic frequency components a digital to analog converter configured to convert the at least one mono signal digital file to analog audio signals;

an amplifier connected to a speaker having a first playable range in the human audible range, said speaker having a second playable range allowing the playing of ultrasonic audio;

a user interface that, when activated, plays back the mono signal digital file through said speaker;

a processor; and memory accessible by, or residing in, said processor, said memory storing a program that, when said program is executed by said processor, said processor causes said speaker to simultaneously emit said audible and ultrasonic frequency components.

14. An apparatus for attracting an animal to an area, the apparatus comprising:

at least one mono signal digital file containing an animal sound obtained by recording an animal sound with a microphone capable of recording ultrasonic audio, the mono signal digital file containing both audible and ultrasonic frequency components;

recordable memory media for storing said at least one mono signal digital file;

a digital to analog converter configured to convert the at least one mono signal digital file to analog audio signals;

a first speaker having a playable range centered in the human audible range, said first speaker configured to emit the analog audio signals in an audible range; and a second speaker having a frequency range allowing the playing of ultrasonic audio, said second speaker configured to emit the analog audio signals in an ultrasonic range, a processor; and memory accessible by or residing in said processor, said memory storing a program, wherein when said program is executed by said processor, said processor causes said first speaker and said second speaker to simultaneously emit the audible and ultrasonic frequency components, respectively, to create a blended sound over both audible and ultrasonic frequency ranges for attracting an animal.

15. The apparatus of claim 14, wherein the at least one mono signal digital file has been equalized to amplify or decrease selected frequency ranges to provide a final sound output having a flat frequency response.

16. The apparatus of claim 14, further comprising (a) a low pass filter that filters the at least one mono signal digital file and permits only frequencies below a predetermined frequency to pass through the filter, and (b) a high pass filter that filters the at least one mono signal digital file and permits only frequencies above a predetermined frequency to pass through the filter.

17. The apparatus of claim 14, further comprising rechargeable batteries for powering the apparatus.

18. The apparatus of claim 14, wherein said playable range of said first speaker is centered at 15,000 hertz or less and said frequency range of said second speaker is centered at 20,000 hertz or more.

19. The apparatus of claim 14, wherein said second speaker is an annunciator or a piezoelectric speaker.

20. The apparatus of claim 14, wherein said processor comprises a component of a programmable microcontroller connected to said first amplifier and said second amplifier.

* * * * *